C. E. SWETT.
MEDICATED PENCIL.
APPLICATION FILED JULY 10, 1915.
1,280,580.
Patented Oct. 1, 1918.
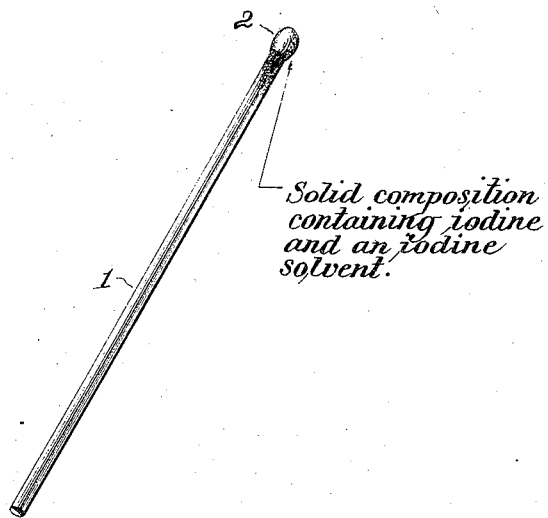
Inventor
Charles E. Swett
By Byrnes Townsend & Breckenstein,
Attorneys

UNITED STATES PATENT OFFICE.

CHARLES E. SWETT, OF BOSTON, MASSACHUSETTS, ASSIGNOR TO ARTHUR D. LITTLE, INCORPORATED, OF BOSTON, MASSACHUSETTS, A CORPORATION OF MASSACHUSETTS.

MEDICATED PENCIL.

1,280,580. Specification of Letters Patent. Patented Oct. 1, 1918.

Application filed July 10, 1915. Serial No. 39,050.

*To all whom it may concern:*

Be it known that I, CHARLES E. SWETT, a citizen of the United States, residing at Boston, in the county of Suffolk and State of Massachusetts, have invented certain new and useful Improvements in Medicated Pencils, of which the following is a specification.

This invention relates to appliances used by physicians for the topical application of medicaments, and variously designated as medicated pencils, styptic pencils, bougies, etc. The object of the present invention is to provide a medicated pencil carrying active iodin.

Iodin, as is well known, is practically insoluble in water, and is active as a medicinal agent only when dissolved in alcohol, an aqueous solution of potassium iodid, or other appropriate solvent. Iodin has heretofore been available as a medicament only in the form of such solutions, which present difficulties and inconveniences in storing, carrying, and applying.

The inconveniences are avoided by the present invention, according to which iodin is applied to a suitable support in conjunction with a salt, usually potassium iodid, which is capable in aqueous solution of dissolving iodin, and is present in sufficient proportion to insure solution either of all of the iodin present or of a sufficient portion thereof to serve as an active medical agent. I have found that intimate mixtures of iodin and potassium iodid when made into a stiff paste with water, possess a considerable cementing power, so that such a paste may be applied to the end of a suitable stick or holder, in much the same manner as a head is applied to a match, and dries out to a cement-like mass which is sufficiently hard to endure the ordinary conditions of storing or shipping. When applied to moist tissue, however, the potassium iodid dissolves, together with the iodin for which the iodid solution is an effective solvent, so that the iodin is applied directly to the tissue in medically active form.

In the accompanying drawing, of which the figure is an elevation of one form of medicated pencil embodying my invention, the support is indicated by the numeral 1, and the tip, containing iodin and an iodin solvent, by the numeral 2.

The invention is not restricted to the use of potassium iodid, since other mineral salts, and notably other soluble iodids, may replace potassium iodid for the purposes of this invention.

In some cases it is desirable to combine with the components above mentioned a small proportion of a suitable water-soluble binder, such as gum arabic. In certain cases, also, it has been found advisable to incorporate with the iodin-iodid mixture, with or without the binder, a small proportion of an iodate, for the purpose of reacting with any hydriodic acid, which may tend to form in small quantities under adverse conditions of storage, this reaction yielding free iodin and thereby insuring the effectiveness of the composition.

Hydriodic acid, being a strong mineral acid, may act as an irritant to sensitive surfaces. Its elimination through the action of the iodate may perhaps proceed according to the following equations:—

(1) $HI + KIO_3 = KI + HIO_3$
(2) $HIO_3 + HI = 2I + H_2O + O_2$
(3) $5HI + HIO_3 = 6I + 3H_2O$.

Whatever the mechanism of the reaction or reactions involved, it is known that hydriodic acid and potassium iodate cannot coexist, and the result of the use of the iodate as herein described is to determine the regeneration of iodin from any hydriodic acid which may be formed.

The support may be of any desired material, including wood, which may be paraffined or otherwise treated to prevent absorption of the solution, glass rods or tubes, rods or strips of rubber, celluloid, or in general any substance capable of serving as a support and not corroded by the mixture.

A suitable composition may comprise 40 parts by weight of iodin and 55 parts of potassium iodid, to which 5 parts of gum arabic may be added if desired. This mixture is ground to a paste with a small amount of water, or of alcohol, or of other liquid capable of dissolving either the iodin or the iodid. This paste is applied to the end of the support as a knob or pellicle, and dried on. The resulting stick is a most convenient means for the local application of iodin either to exterior or mucous surfaces. In use the surfaces to which iodin is to be applied is dampened if necessary, and the coated end of the stick is applied to the desired area. One of the advantages of such an appliance, in addition to convenience and portability, is that the application may be strictly limited to the desired point or area. Also, on account of the fact that the solution of the iodin is dependent upon the solution of the iodid, the amount of iodin applied may be accurately controlled by a longer or shorter application of the pencil.

The relative proportion between the iodin and the iodid is not important from the viewpoint of medicinal efficiency, but it is preferred to have the iodin in less proportion than the iodid. This is primarily because the amount of iodin which it is possible to dissolve is limited by the amount of iodid present; and also because these proportions yield a satisfactorily plastic or moldable composition. Such a composition I designate as "cementitious."

I claim:—

1. A medicated pencil comprising a support having applied thereto a solid cementitious composition containing iodin and an iodin solvent.

2. A medicated pencil comprising a support having applied thereto a solid cementitious composition containing iodin and a soluble iodid.

3. A medicated pencil comprising a support having applied thereto a solid cementitious composition containing iodin and potassium iodid.

4. A medicated pencil comprising a support having applied thereto a composition containing iodin, an iodin solvent, and an iodate.

5. A medicated pencil comprising a support having applied thereto a composition containing iodin, a soluble iodid, and an iodate.

In testimony whereof I affix my signature in presence of two witnesses.

CHARLES E. SWETT.

Witnesses:
CARL F. WOODS,
HARRY S. MORT.